United States Patent
Chen et al.

(10) Patent No.: US 8,930,600 B2
(45) Date of Patent: Jan. 6, 2015

(54) PROTECTING CIRCUIT FOR BASIC INPUT OUTPUT SYSTEM CHIP

(71) Applicants: Guo-Yi Chen, Shenzhen (CN); Bo Tian, Shenzhen (CN); Yang Gao, Shenzhen (CN)

(72) Inventors: Guo-Yi Chen, Shenzhen (CN); Bo Tian, Shenzhen (CN); Yang Gao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/675,127

(22) Filed: Nov. 13, 2012

(65) Prior Publication Data

US 2013/0173831 A1 Jul. 4, 2013

(30) Foreign Application Priority Data

Dec. 29, 2011 (CN) .......................... 201110450160.2

(51) Int. Cl.
- *G06F 13/00* (2006.01)
- *G06F 15/177* (2006.01)
- *G06F 9/00* (2006.01)
- *G06F 13/28* (2006.01)

(52) U.S. Cl.
USPC ................ 710/107; 713/2; 713/194; 711/163

(58) Field of Classification Search
USPC ........................ 710/107; 713/2, 194; 711/163
See application file for complete search history.

(56) References Cited

U.S. PATENT DOCUMENTS

| | | | | |
|---|---|---|---|---|
| 5,109,521 | A | * | 4/1992 | Culley ........................... 711/165 |
| 5,341,494 | A | * | 8/1994 | Thayer et al. ................. 711/115 |
| 5,408,636 | A | * | 4/1995 | Santeler et al. ............... 711/163 |
| 5,724,550 | A | * | 3/1998 | Stevens ......................... 711/146 |
| 5,751,998 | A | * | 5/1998 | Wunderlich et al. .......... 711/163 |
| 5,809,559 | A | * | 9/1998 | Kim ............................... 711/202 |
| 5,889,987 | A | * | 3/1999 | Nelson et al. ..................... 713/2 |
| 6,108,741 | A | * | 8/2000 | MacLaren et al. ............ 710/314 |

(Continued)

FOREIGN PATENT DOCUMENTS

| | | | | |
|---|---|---|---|---|
| CN | 101430665 A | * | 5/2009 | .............. G06F 12/14 |
| CN | 101464933 A | * | 6/2009 | .............. G06F 21/02 |

(Continued)

OTHER PUBLICATIONS

Nikolaou et al., "Memory array protection: Check on read or Check on Write?," Design, Automation & Test in Europe Conference & Exhibition (Date), 2013, pp. 214-219, Mar. 18-22, 2013.*

(Continued)

*Primary Examiner* — Faisal M Zaman
(74) *Attorney, Agent, or Firm* — Novak Druce Connolly Bove + Quigg LLP

(57) ABSTRACT

A protecting circuit for a basic input output system (BIOS) chip of a computer includes a platform controller hub (PCH), an inverting circuit connected to the PCH, a BIOS socket to connect the BIOS chip, and a controlling circuit connected between the inverting circuit and the BIOS socket. The PCH outputs a first signal or a second signal, and a third signal. The inverting circuit outputs an inverted signal with a level contrary to the first or second signal. The controlling circuit receives the first or second signal and the inverted signal, to output a processing signal to the BIOS socket, thereby controlling write-protection states of the BIOS chip.

8 Claims, 4 Drawing Sheets

(56) References Cited

U.S. PATENT DOCUMENTS

| | | | |
|---|---|---|---|
| 6,215,717 B1 * | 4/2001 | Takeguchi et al. | 365/230.03 |
| 6,532,500 B1 * | 3/2003 | Li et al. | 710/15 |
| 2006/0272020 A1 * | 11/2006 | Gardner | 726/23 |
| 2012/0117308 A1 * | 5/2012 | Lou et al. | 711/103 |

FOREIGN PATENT DOCUMENTS

| | | | | |
|---|---|---|---|---|
| CN | 102467626 A * | 5/2012 | | G06F 21/572 |
| CN | 103186448 A * | 7/2013 | | G06F 9/4403 |
| CN | 103543785 A * | 1/2014 | | G06F 1/16 |

OTHER PUBLICATIONS

Hatano et al., "A study on read-write protection of a digital document by cryptographic techniques," Mobile Adhoc and Sensor Systems, 2009. MASS '09. IEEE 6th International Conference on, pp. 714-721, Oct. 12-15, 2009.*

* cited by examiner

PROTECTING CIRCUIT FOR BASIC INPUT OUTPUT SYSTEM CHIP

BACKGROUND

1. Technical Field

The present disclosure relates to a protecting circuit for a basic input output system (BIOS) chip.

2. Description of Related Art

A BIOS chip is employed to detect statuses of a number of components, such as memories and hard disk drives, during booting up. The BIOS chip includes a write protection pin. When the write protection pin is at a high level, such as logic 1, it indicates that the BIOS chip is writeable, thus a user can write some codes into the BIOS chip to update the BIOS chip. When the write protection pin is at a low level, such as logic 0, it indicates that the BIOS chip is write-protected. For example, when a computer is in S5 state, the write protection pin is at the high level. However, when the computer is booting up, the BIOS chip does a power-on self-test, during this time, the write protection pin may be at high level. If a user mistakenly writes to the BIOS chip at that time as the write protection pin is at high level, the BIOS chip may be damaged, and the booting could be interrupted.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
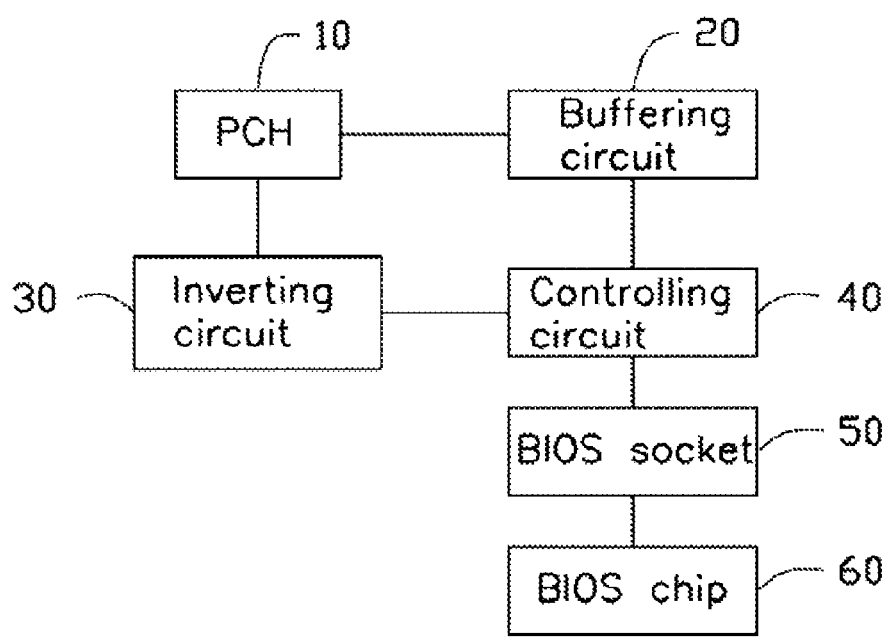
FIG. 1 is a block diagram of an embodiment of a protecting circuit for a basic input output system (BIOS) chip of the present disclosure.

FIG. 1 illustrates an embodiment of a protecting circuit for a basic input output system (BIOS) chip 60 of a computer of the present disclosure. The protecting circuit includes a platform controller hub (PCH) 10, a buffering circuit 20, an inverting circuit 30, a controlling circuit 40, and a BIOS socket 50 connected to the BIOS chip 60.

Figure 2:
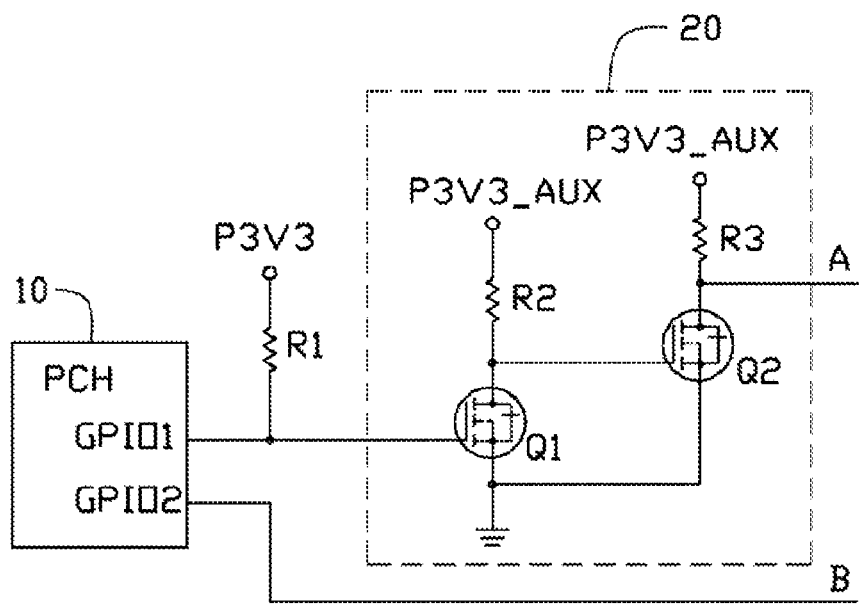
FIG. 2 is a circuit diagram of a buffering circuit and a platform controller hub (PCH) of the protecting circuit of FIG. 1.

FIG. 2 illustrates a detailed circuit diagram of the buffering circuit 20 and the PCH 10. The PCH 10 includes a first general purpose input output (GPIO) pin GPIO1 and a second GPIO pin GPIO2. The first GPIO pin GPIO1 is coupled to a first power terminal P3V3 through a resistor R1. The power terminal P3V3 outputs a voltage when the computer is powered up, and when the computer is powered down, the power terminal P3V3 does not output the voltage. Therefore, the first GPIO pin GPIO1 outputs a high level signal, when the computer is powered up, and outputs a low level signal when the computer is powered down. The second GPIO pin GPIO2 outputs a high level signal during computer boot up, and outputs a low level signal after the computer boots up successfully.

The buffering circuit 20 includes two resistors R2 and R3, and two field effect transistors (FETs) Q1 and Q2. A gate of the FET Q1 is coupled to the first GPIO pin GPIO1. A source of the FET Q1 is grounded. A drain of the FET Q1 is coupled to a second power terminal P3V3_AUX through the resistor R2, and coupled to a gate of the FET Q2. A drain of the second FET Q2 is coupled to the second power terminal P3V3_AUX through the resistor R3. A source of the FET Q2 is grounded. The second power terminal P3V3_AUX always outputs a voltage whether the computer is on or off. The buffering circuit 10 receives a power signal from the first GPIO pin GPIO1, buffers the power signal, and outputs a buffering signal through the drain of the second FET Q2. In the embodiment, the FET Q1 and FET Q2 are n-channel FETs.

Figure 3:
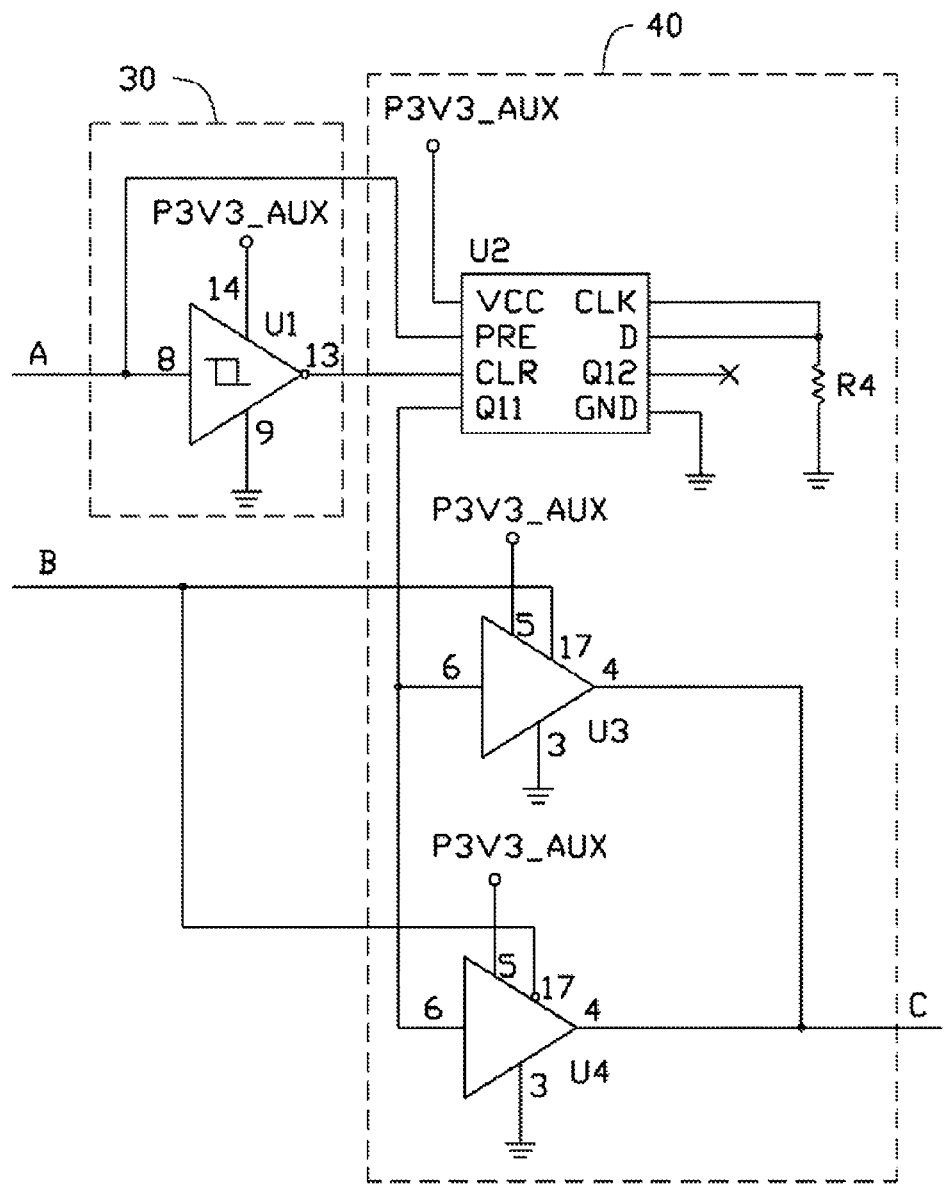
FIG. 3 is a circuit diagram of an inverting circuit and a controlling circuit of the protecting circuit of FIG. 1.

FIG. 3 illustrates a detailed circuit diagram of the inverting circuit 30. The inverting circuit 30 includes an inverter U1. An input terminal 8 of the inverter U1 is connected to the drain of the second FET Q2, to receive the buffering signal. A power terminal 14 of the inverter U1 is coupled to the second power terminal P3V3_AUX. A ground terminal 9 of the inverter U1 is grounded. An output terminal 13 of the inverter U1 outputs an inverted signal. When the inverter U1 receives a high level buffering signal, the inverter U1 outputs a low level signal; and when the inverter U1 receives a low level buffering signal, the inverter U1 outputs a high level signal.

The controlling circuit 40 includes a trigger U2, a first buffer gate chip U3, a second buffer gate chip U4, and a resistor R4. The trigger U2 includes a power pin VCC, a clock signal pin CLK, a predefined pin PRE, a clear pin CLR, a ground pin GND, a data input pin D, and two output pins Q11 and Q12. The power pin VCC is coupled to the second power terminal P3V3_AUX. The clock signal pin CLK and the data input pin D are grounded through the resistor R4. The signal output pin Q12 is idle, and the ground pin GND is grounded. The predefined pin PRE of the trigger U2 is connected to the drain of the second FET Q2, to receive the buffering signal from the buffering circuit 20. The clear pin CLR is connected to the output terminal 13 of the inverter U2, to receive the inverted signal from the inverting circuit 30. The output pin Q11 is to output a control signal according to the buffering signal and the inverted signal. For example, if the buffering signal is at low level, and the inverted signal is at high level, the output pin Q11 outputs a control signal with a high level. If the buffering signal is at high level, and the inverted signal is at low level, the output pin Q11 outputs a control signal with a low level.

The first and second signal bus buffer gate chips U3 and U4 each include a power pin 5 coupled to the second power terminal P3V3_AUX, an input pin 6 connected to the output pin Q11 of the trigger U2 to receive the control signal from the trigger U2, an enable pin 17 coupled to the second GPIO pin GPIO2 of the PCH 10, a ground pin 3 grounded, and an output pin 4. If the first and second signal bus buffer gate chips U3 and U4 receive a high level signal from the second GPIO pin GPIO2, the first signal bus buffer gate chip U3 is turned on, and the second signal bus buffer gate is turned off. The first signal bus buffer gate chip U3 outputs a process signal through the output pin 4, which is in accordance with the control signal output from the output pin Q11 of the trigger U2. If the first and second signal bus buffer gate chips U3 and U4 receive a low level signal from the second GPIO pin GPIO2, the first signal bus buffer gate chip U3 is turned off, and the second signal bus buffer gate chip U4 is turned on. The second signal bus buffer gate chip U3 outputs a process signal through the output pin 4, which is in accordance with the control signal output from the output pin Q11 of the trigger U2.

Figure 4:
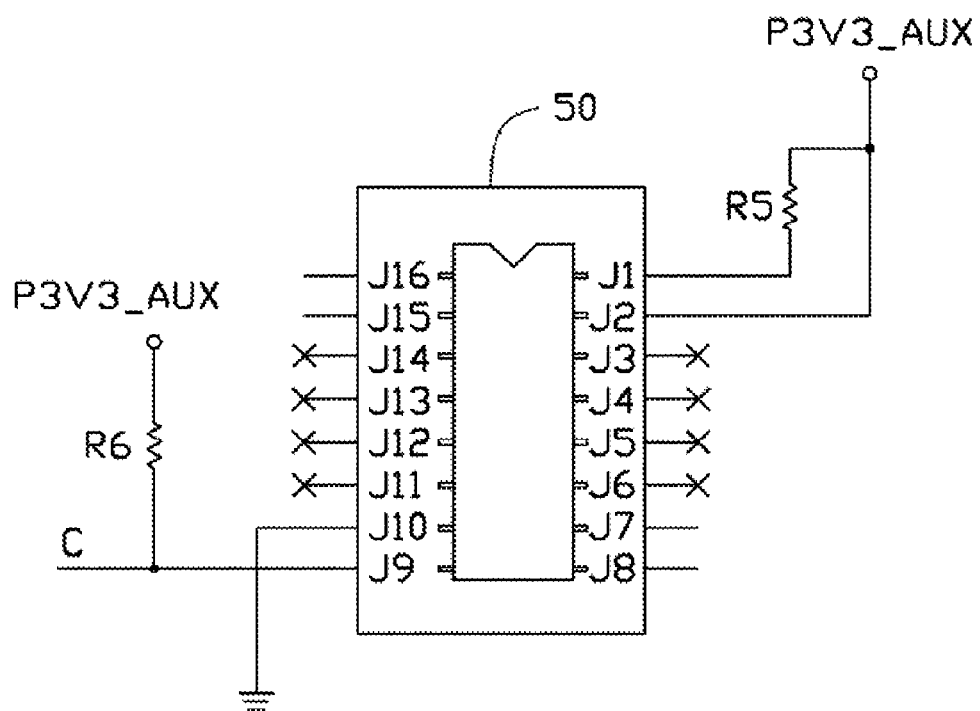
FIG. 4 is a circuit diagram of a BIOS socket of the protecting circuit of FIG. 1.

FIG. 4 illustrates a detailed circuit diagram of the BIOS socket 50. The BIOS socket 50 includes 16 pins J1-J16. The pin J9 is a write protection pin. The pin J9 is coupled to the second power terminal P3V3_AUX through a resistor R6, and coupled to the output pins of the first and second signal bus buffer gate chips U3 and U4. The pin J1 is a power pin and coupled to the second power terminal P3V3_AUX through a resistor R5. The pin J2 is a power pin and is coupled to the second power terminal P3V3_AUX.

When the computer is turned off, the PCH 10 outputs a low level signal through the first GPIO pin GPIO1, and outputs a high level signal through the second GPIO pin GPIO2. The gate of the first FET Q1 receives the low level signal, and the first FET Q1 is turned off. The gate of the second FET Q2 is at a high level, and the FET Q1 is turned on. The drain of the second FET Q2 is at low level, so that the buffering circuit 20 outputs a low level buffering signal to the inverter U1. The inverter U1 outputs a high level signal through the output pin 13. The trigger U2 receives the high level signal through the clear pin CLR, and receives the low level buffering signal through the predefined pin PRE. The trigger U2 outputs a high level control signal. The first signal bus buffer gate chip U3 receives a high level enable signal from the second GPIO pin GPIO2, and the first signal bus buffer gate chip U3 outputs a high level process signal, which is in accordance with the control signal, so that the write protection pin J9 receives the high level process signal, making the BIOS chip 60 writeable.

When the computer is powered on, the BIOS chip 60 does a power-on self-test. In order to protect the BIOS chip 60 from being written to at that time, the BIOS chip 60 should be in a write-protected state.

During the power-on self-test, the first and second GPIO pins GPIO1 and GPIO 2 of the PCH 10 both output high level signals. The first FET Q1 is turned on, and the second FET Q2 is turned off. Accordingly, the drain of the second FET Q2 is at a high level, the buffering circuit 20 outputs a high level buffering signal. The inverting circuit 30 receives the high level buffering signal and outputs a low level inverted signal. At that time, the predefined pin PRE of the trigger U2 receives the high level buffering signal and the clear pin CLR of the trigger U2 receives the low level inverted signal, thus, the trigger U2 outputs a low level control signal through the output pin Q11 to the first and second buffer gate chips U3 and U4. The first buffer gate chip U3 is turned on and the second buffer gate chip U4 is turned off so that the second GPIO pin GPIO 2 outputs a high level signal. In that condition, the first buffer gate chip U3 outputs a low level process signal to the write protection pin J9 of the BIOS socket 50, to enable write-protection of the BIOS chip 60.

After the BIOS chip 60 does the power-on self-test, an operation system of the computer will be started. During this process, the BIOS chip 60 should be self-definable. The second GPIO pin GPIO2 outputs a low level signal. The first buffer gate chip U3 is turned off, and the second buffer gate chip U4 is turned on. The write protection pin J9 of the BIOS socket 50 receives the process signal in accordance with the power signal output by the first GPIO pin GPIO1. For example, if the first GPIO pin GPIO 1 outputs a high level signal. As described above, the second signal bus buffer gate chip U4 outputs a low level process signal to enable write-protection of the BIOS chip 60. If the first GPIO pin GPIO1 outputs a low level signal, the second signal bus buffer gate chip U4 outputs a high-level process signal to enable the BIOS chip 60 to be writable. Accordingly, the BIOS chip 60 is self-definable after the power-on self-test state.

As described above, the first and second FETs Q1 and Q2 function as electronic switches. Consequently, in other embodiments, the first and second FETs Q1 and Q2 may be replaced by other transistors that can function as switched, such as bipolar transistors.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A protecting circuit for a basic input output system (BIOS) chip of a computer, comprising:
    a platform controller hub (PCH) comprising a first pin and a second pin, wherein the first pin outputs a low level first signal, and the second pin outputs a high level second signal, in response to the computer being powered off; the first pin outputs a high level third signal, and the second pin outputs a high level second signal, in response to the computer being in a power-on self-test state;
    an inverting circuit connected to the PCH, to receive the first or third signal, and outputs an inverted signal with a level contrary to the level of the first or third signal;
    a BIOS socket to connect the BIOS chip, the BIOS socket comprising a write protection pin; and
    a controlling circuit connected between the inverting circuit and the BIOS socket, the controlling circuit comprising a trigger and a first buffer gate chip, wherein the trigger is to receive the first or third signal and the inverted signal, and outputs a control signal based on the first or third signal and the inverted signal to the first buffer gate chip, the first signal bus buffer gate chip is to receive the second signal to control the first signal bus buffer gate chip to be turned on, and outputs a process signal to the write protection pin of the BIOS socket;
    wherein the inverting circuit outputs a high level inverted signal, the first buffer gate chip outputs a high level process signal, to enable the BIOS chip to be in a state of writable, in response to the PCH outputting the low level first signal and the high level second signal; the inverting circuit outputs the low level inverted signal, the first buffer gate chip outputs the low level process signal, to enable the BIOS chip to be in a state of write-protection, in response to the PCH outputting the third high level signal and the high level second signal.

2. The protecting circuit of claim 1, wherein the controlling circuit further comprises a second bus buffer gate chip, after the state of power-on self-test, the second pin of the PCH outputs a low level fourth signal, to enable the second buffer gate chip to be turned on, and the first buffer gate chip to be turned off, the second buffer gate chip outputs a process signal in accordance with the control signal from the trigger to the write protection pin of the BIOS socket.

3. The protecting circuit of claim 2, further comprising a buffering circuit connected between the PCH and the controlling circuit, wherein the buffering circuit is to receive the first or third signal, and outputs a buffering signal in accordance with the first or third signal to the inverting circuit and the trigger.

4. The protecting circuit of claim 3, wherein the buffering circuit comprises a first electronic switch, a second electronic switch, a first resistor, and a second resistor, a first terminal of the first electronic switch is coupled to the first pin of the PCH, a second terminal of the first electronic switch is grounded, a third terminal of the first electronic switch is coupled to a power terminal through the first resistor, and coupled to a first terminal of the second electronic switch, a second terminal of the second electronic switch is grounded, a third terminal of the second electronic switch is coupled to the power terminal through the second resistor, and outputs the buffering signal; wherein the second terminal of each of the first and second electronic switches is connected to the third terminal of the corresponding one of the first and second electronic switches, in response to the first terminal of each of the first and second electronic switches receiving a high level signal; the second terminal of each of the first and second electronic switches is disconnected from the third terminal of the corresponding one of the first and second electronic switches, in response to the first terminal of each of the first and second electronic switches receiving a low level signal.

5. The protecting circuit of claim 4, wherein the first electronic switch is an n-channel field effect transistor (FET), a gate, a source, and a drain of the n-channel FET are corresponding to the first, second, and third terminals of the first electronic switch.

6. The protecting circuit of claim 4, wherein the second electronic switch is an n-channel field effect transistor (FET), a gate, a source, and a drain of the n-channel FET are corresponding to the first, second, and third terminals of the second electronic switch.

7. The protecting circuit of claim 4, wherein the inverting circuit comprises an inverter, a first terminal of the inverter is to receive the buffering signal, a second terminal of the inverter is grounded, a third terminal of the inverter is coupled to the power terminal, a fourth terminal of the inverter outputs the inverted signal.

8. The protecting circuit of claim 7, wherein a power pin of the trigger is coupled to a power terminal, a ground pin of the trigger is grounded, a clock signal pin and a data input pin of the trigger are grounded through a third resistor, a predefine pin of the trigger is to receive the first or third signal from the first pin of the PCH, a clear pin of the trigger is to receive the inverted signal from the inverting circuit, a first output pin of the trigger is idle, a second output pin of the trigger is to output the control signal based on the first or third signal and the inverted signal, wherein the second output pin of the trigger outputs the low level control signal, in response to the PCH outputting the high level third signal and the low level fourth signal; the second output pin of the trigger outputs a high level control signal, in response to the PCH outputting the low level first signal and the high level second signal.

* * * * *